Nov. 21, 1939.   F. ROSNER   2,180,851
DRIVING MEANS FOR ROTARY PUMPS AND ENGINES
Filed Jan. 28, 1938   4 Sheets-Sheet 1
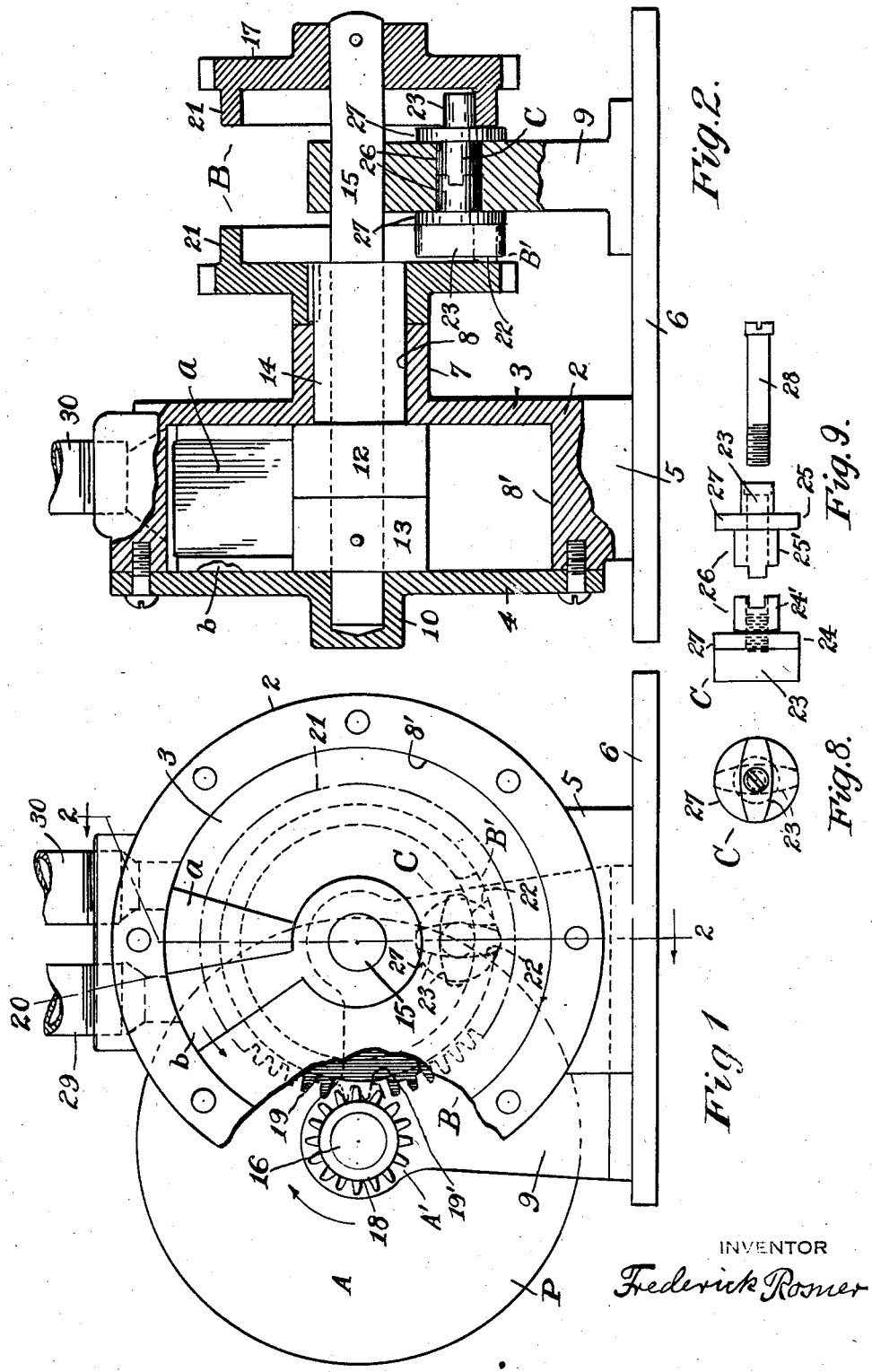
INVENTOR
Frederick Rosner

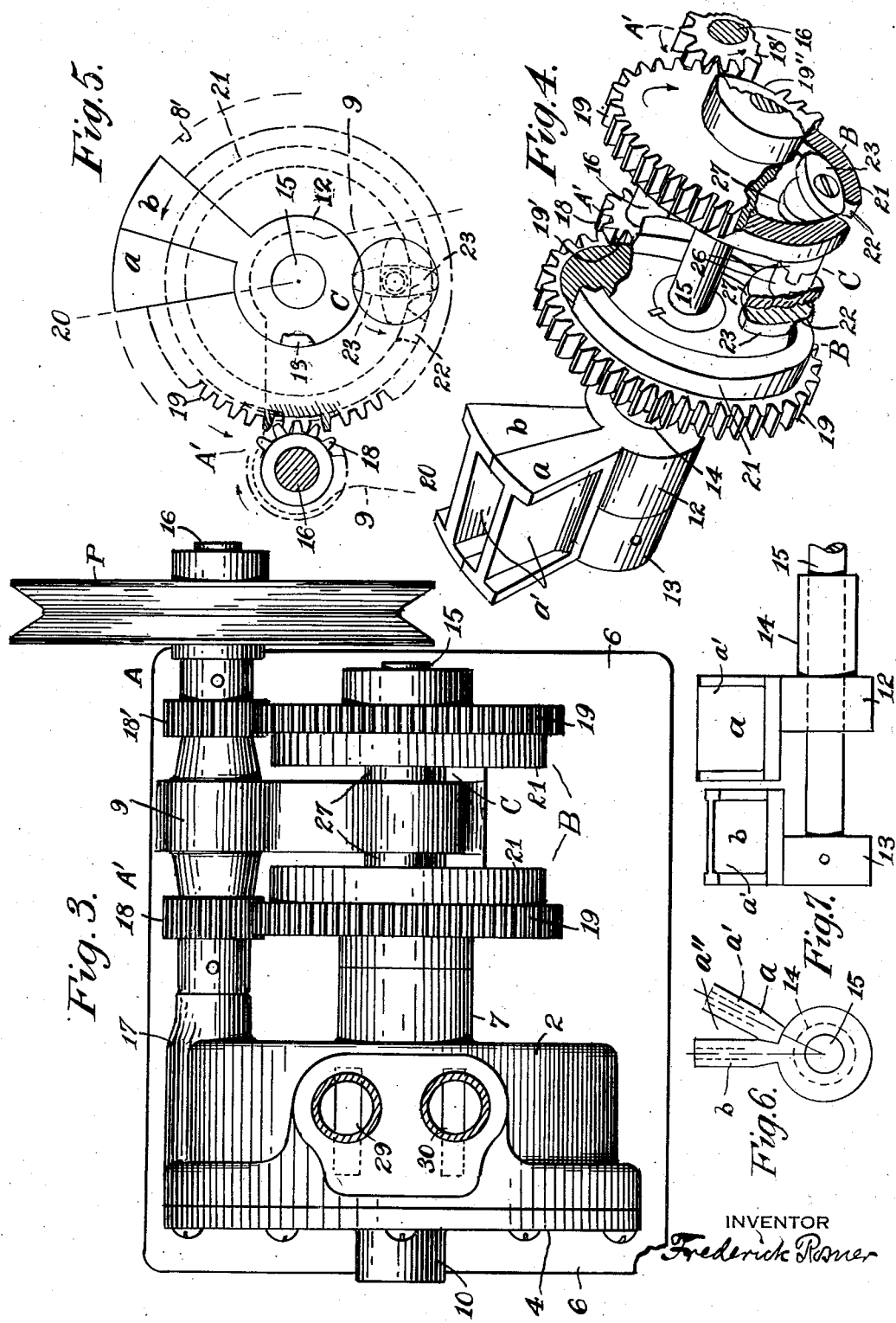

Nov. 21, 1939.   F. ROSNER   2,180,851
DRIVING MEANS FOR ROTARY PUMPS AND ENGINES
Filed Jan. 28, 1938   4 Sheets-Sheet 3
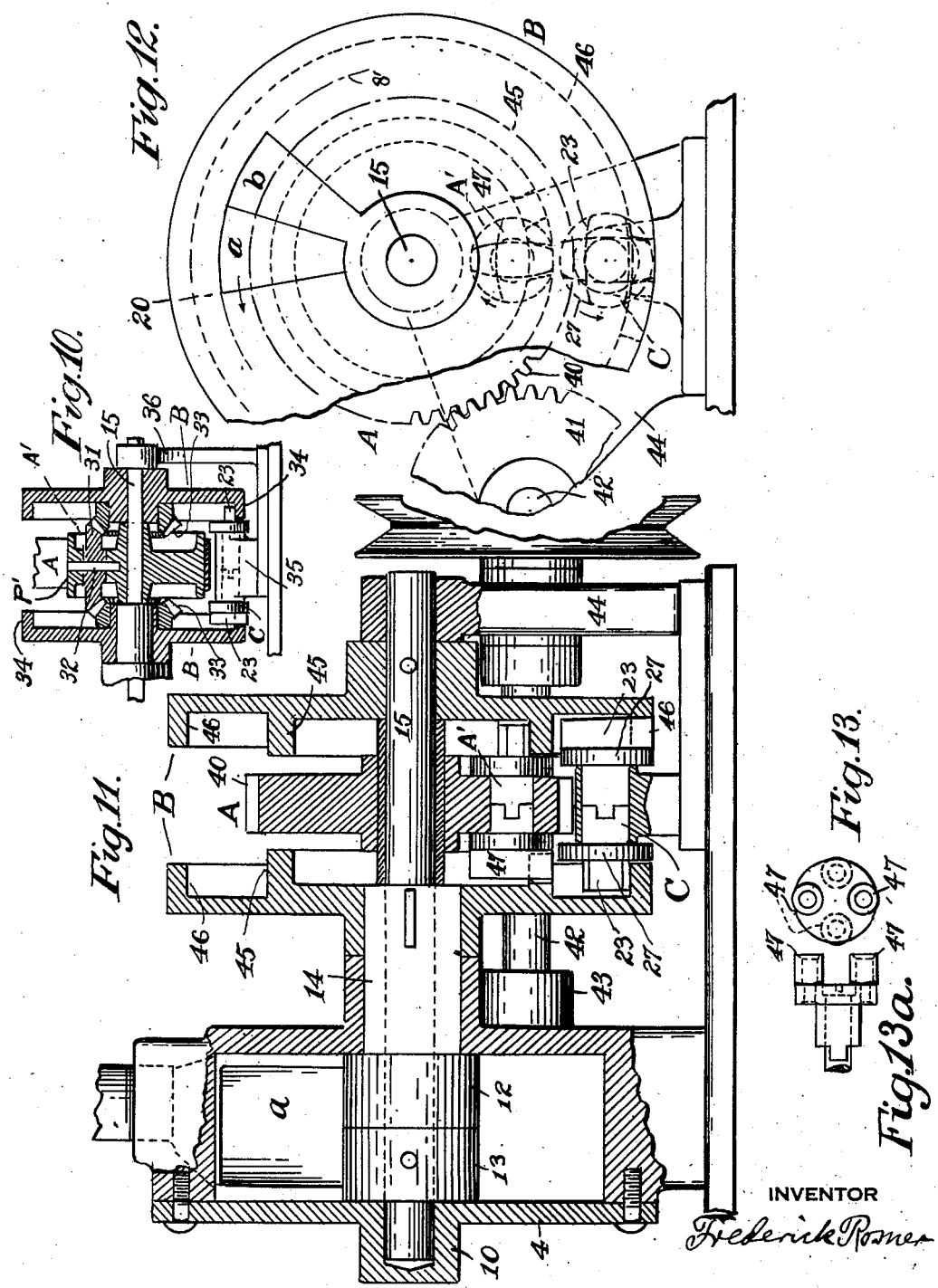
INVENTOR
Frederick Rosner

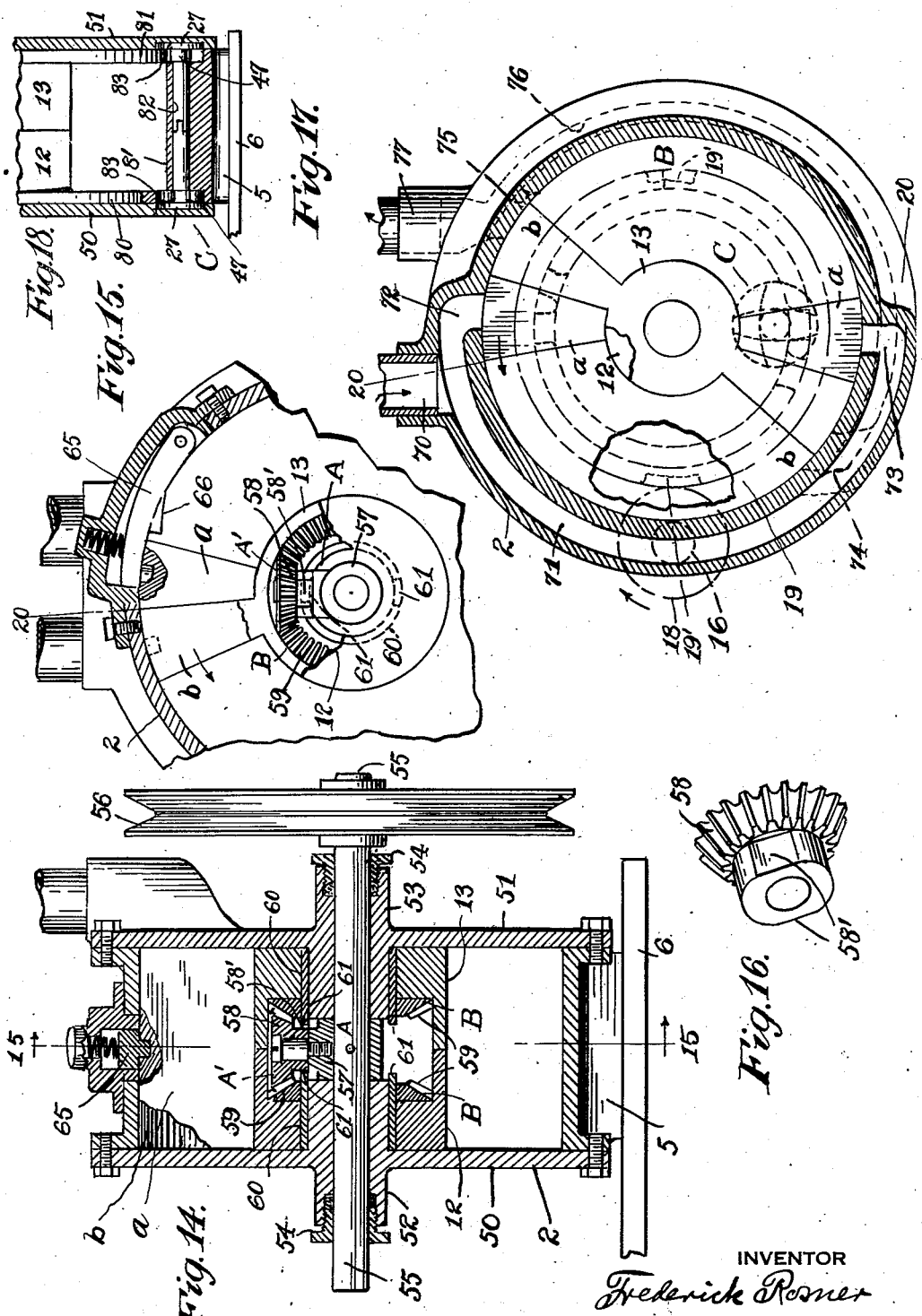

Patented Nov. 21, 1939

2,180,851

UNITED STATES PATENT OFFICE 2,180,851

DRIVING MEANS FOR ROTARY PUMPS AND ENGINES

Frederick Rosner, Brooklyn, N. Y.

Application January 28, 1938, Serial No. 187,419

6 Claims. (Cl. 103—129)

This invention relates to pumps, compressors, engines and the like, and refers more particularly to a rotary type, wherein a pair or more of radial blades or piston members are employed, that are mounted on shafts the axes of which coincide with the axis of the cylinder bore in which they rotate. The blades are alternately driven, in a clockwise manner, whereby one or more blades of one set, is at rest forming abutment walls, during the rotation of the other one, or more blades of the other set, acting as pistons.

The invention particularly deals with the driving means to propel the blades to provide continuous and uniform motion throughout the full period of motion of each pair, or set of blades, during a locked and rest period of the other pair, or set.

Incorporated with this alternating driving means and becoming a part thereof is a rotary interlocking member, adapted to unlock one blade, or set of blades of the set, and lock the other blade or set, during a period in the cycle of rotation, when both single blades, or sets move together. This occurs at the change period at the start of rotation of one blade or set, from the rest position thereof, to the rest position of the other blade or set, at which time both blades or sets of blades are joined together by the locking means.

The principal object therefore, of the present invention is to provide a very reliable driving means adapted to steadily and uniformly rotate in alternation the shafts and thereby the blades, which blades are the pistons, during the rotating action thereof, and form the abutment walls when at rest. The blades are so driven that both blades of the pair are simultaneously driven during the period that one blade is started to rotate while the other one is coming to a rest position, this being provided by a rotary interlocking means incorporated with the driving means to positively control the alternating action of the blades during the change period thereof, joining the blades by this locker to produce unbroken and continuous motion of the blades at this time, by a kind of overlapping action in the cycle of rotation, both blades moving together, or in other words, when one blade has nearly completed a full rotation by its driver at the change period, the other blade which at that time was acting as an abutment wall is engaged by the rotating blade still working as a piston, forcing the abutment blade to an advanced position, and into driving and rotating action without a hesitation in the cycle of action, the rotary locking member at this time engaging the drivers in a manner to hold the blades locked together, until the final fully locked position of the blade is attained, and likewise unlocking the other blade from starting its rotation, provides continuous pumping action when used as a pump, or driving action when the blades are used reversely by force applied to the blades, as by steam or other means.

Another object of the invention is to provide such a combination of parts particularly adapted for this driving mechanism, capable of driving from either end of the train of parts, and in reverse directions of rotation thereof, whereby the same is particularly adapted to drive the blades from one end of the train for a pumping action of the blades, and from the other end of the train, by force applied to the blades, in which latter case, the pulley of the driving means serves as a flywheel, for steady and smooth action of rotation.

Other objects of my invention will be set forth in the following description and drawings, which illustrate certain preferred embodiments thereof, or will be obvious therefrom without being specifically pointed out. It will be understood that the foregoing general statement of the objects is intended merely to generally explain the same, and not limit it in any manner.

With the above and other objects of the invention in view, the invention consists in the novel construction, arrangement and combination of various devices, elements and parts, as set forth in the claims hereof, certain embodiments of the same being illustrated in the said drawings and described in this specification.

In the accompanying drawings,

Fig. 1 is a front view of my driving means, showing a cylindrical casing employing alternately rotating blades in their singular form, and shown as used in a pumping action, the front cap of the casing being removed, and a part of the casing being broken away to more clearly show the mechanism.

Fig. 2 is a longitudinal section, taken on line 2—2 of Fig. 1.

Fig. 3 is a plan view of the device as illustrated in Fig. 1 and Fig. 2.

Fig. 4 is a perspective view of the driving mechanism employed in the form shown in Figs. 1, 2, and 3, and shows the parts in the same position as seen in Fig. 1, looking from the rear of the mechanism.

Fig. 5 is a diagrammatic view, and shows an advanced step in the movement of the blades.

Figs. 6 and 7 are detail views of the preferred form of the blades, showing respectively front and side views thereof.

Figs. 8 and 9 are detail views of a rotatable interlocking member, showing front and side elevations thereof.

Fig. 10 is a longitudinal section, showing a modified form of the driving means, the view being shown on a reduced scale, and the cylinder casing being broken away.

Fig. 11 shows a modified form of the driving means, similar to that shown in Fig. 10, on a larger scale employed, as a direct drive and without the use of gears, by introducing a rotary clutch, adapted to alternately engage one or the other of the blade driving members, the blades being shown in the same position as the showing of Fig. 1.

Fig. 12 is a diagrammatic view, of the mechanism of Fig. 11, showing a front view, the blades being advanced to a position, as shown in Fig. 5.

Figs. 13 and 13A are, respectively, detail views, showing end and side elevations of a revolving clutch member, as used in Figs. 11 and 12. This member being similar to the rotary interlocking member shown in Figs. 8 and 9, rollers being used instead of integral driving or engaging portions for engaging and interlocking with the driving discs.

Fig. 14 is a view, showing the form of my driving mechanism used in Fig. 10, except that here the driving means is arranged to be within the cylinder casing, providing an enclosed and compact form thereof, a modified form of the blade locking means being also shown.

Fig. 15 is a fragmentary sectional view, taken on line 15—15 of Fig. 14, looking in the direction of arrows.

Fig. 16 is a detail view in perspective of the driving clutch member as used in the showing of Figs. 14 and 15.

Fig. 17 is a view showing multiple blades as applied to the driving means.

Fig. 18 is a view of the locking member, shown mounted within the cylinder to co-act with side discs of the blades.

As shown in the drawings, several forms of my improved driving means are illustrated, each embodying a constantly driven driver member, designated in all the forms thereof, in a general way by A, and having connected therewith a means for engaging alternately with a pair of driving discs fixed to the blades they are driving, said means, designated generally by A', and the driving discs, designated generally by B, and the discs, also have means, designated by B', for engaging with the said means A'.

An interlocking means, generally designated by C, is adapted to lock one or the other of said driving discs against rotation, during a period of rotation of the other driver disc. In the cycle of rotation, the interlock will function to cause both discs to move together, and the interlocking means is so designed that it will lock itself against rotation, when fully locked in position in one driving disc, during the rotation of the other.

My improved driving means is shown applied to a pump having a cylindrical casing in which a pair of radial blades are alternately driven in a clockwise manner rotating on the same axis of the bore of the cylinder.

The cylinder casing 2 as here shown has a rear wall 3, a front closure cap 4, and a foot portion 5 for attachment thereof to a base plate 6.

The cylinder has a bearing 7 extending from the rear wall 3, the bore 8 of the bearing being concentric with the bore 8' of the cylinder. An outer bearing member 9, attached to the base, provides a support for the shaft of the driving means A, the locker C, and the shafts of the blades. The front closure cap 4, also has a short bearing extension 10, to aid in the support of this driving mechanism.

The radial blades, best seen in Fig. 4 and indicated by a and b, are of segmental form, preferably so constructed when solid in cross section, to make close contact with each other, at both sides thereof, using this contact as a stop. The blades however, may be lightened by providing recesses a' in the sides thereof, as shown in Fig. 4, or the blades may be shaped as in Figs. 6 and 7, retaining the stop faces at the lower portions thereof, and provide open portions a'', between the sides, at the top, for a purpose hereinafter explained.

Each blade has integrally connected, a hub 12 and 13, the blade a having the hub 12 extending from the center of the blade, along the line of its axis, and rearwardly thereof, terminating in the form of a sleeve, to serve as a hollow shaft 14, which rotates in the bearing 7 of the casing. The hub 13 of the blade b, is short and extends from the center to the front of the casing. One end of each blade overlaps the hub of the other. The hub of the blade b is bored to receive a shaft 15, to which it is fixed, and the shaft rotates freely in the bore of the sleeve 14 of the other blade a, one end of the shaft being supported in the bearing 10 of the cap 4, and the other end in the bearing member 9.

The blades revolve freely in the casing, making close contact with the bore of the cylinder by the outer curved periphery of the blades. The end walls of the blades engage the side wall of the cap 4 and rear wall 3 of the casing, and that portion of the blades adjacent the hub and free thereof, which will overlap each other, in their operative position, similar to a hinge joint, close the cylinder chamber, to provide an intake and outlet portion of the cylinder between the blades.

I have briefly described the blades, the construction of which may vary to suit the purpose for which they are used.

When the blades are employed for pumping, in which case they are driven by the driving means, they may be solid, and of segmental form, with the sides contacting the full length thereof, to act as stops, and when the blades are used, as in an engine and drive the driving mechanism, they may be arranged with the recessed portion a' and the open spaces a'' between the blades at the upper portion as shown, to provide for expansion of steam, or ignition from the side, and between the blades, depending on the medium used as a force to drive the blades. This feature of driving by the blades will be the subject matter of a contemplated application.

Referring now more particularly to one form of my driving means, as shown in Figs. 1 to 9 inclusive, in which a single pair of blades are employed, as a pump, the constantly driven driving means A is shown as a shaft 16 rotatably supported in a bearing hub 17 of the casing 2, and in the bearing member 9, driven by a pulley P. The shaft has fixed thereto the driving engaging means A', shown as pinions 18 and 18', adapted to engage alternately the driving discs B, which are fixed to the blades a and b, one to the sleeve 14 of blade a, and the other fixed to the shaft 15 to which the blade b is fixed.

The discs B are each provided with the means B', for alternately engaging with the means A', here shown as teeth 19, that mesh with the pinions. Each disc has a portion of the teeth 19 removed, as at 19' and 19'', so that when the front face of either of the blades a or b is in the position, as indicated in Figs. 1 and 4, and shown by the radial line 20, the portion of the disc B, of blade a, indicated by 19' with the teeth removed will be free of the pinion 18, and be at rest.

In Figs. 1 and 4, the blade a occupies this position, and shows that the blade b has been moved forward by blade a, doing so by the contact portions of the blades, to thereby move the disc of blade b forward therewith, as well as that portion thereof 19'' without the teeth, and that part with the teeth 19, of that disc, into engagement with the pinion 18'. This portion will rotate the blade b, to the position shown in Fig. 5, and while still in mesh with the pinion 18' will move the blade a by contact therewith into mesh with pinion 18, and the blade b, to the line 20, when blade a is again making its rotation.

To secure the blades together, during this change period, while both blades move together, and hold one blade locked, during the rotation of the other, a rotary interlocking member C is provided, which becomes an important part of this driving mechanism.

This rotary interlocking member is rotatably mounted in the bearing member 9, to engage with opposite ends thereof in flanged portions 21, of the driving discs B, each of which have a tooth space 22 cut therein, to engage with double ended engaging members 23, of the interlocker, these ends being disposed at right angles to each other, and so constructed, that one end, of one double ended member, is adapted to engage in a tooth space 22, when in an upright position thereof, as seen in Figs. 1 and 5, and will be in a fully locked position with the disc it so engages, while the other double end at right angles thereto, will lie in the inner curved periphery of the flange of the other disc. The sides of the double ended members are curved to fit the contour of the flanges, and these double ended members, as a whole will appear, as seen from an end view thereof, as a pinion, and will operate as such, as will be understood.

The locker at the change period, which is the time that both blades are moving together, as stated, will rotate a quarter of a revolution, whereby alternately, one end thereof, is laying with one of its curved sides in the inner contour of the flange of a disc, during which time the other end is engaged by one of its engaging ends in a tooth space of the other flange, and while the locker is rotating from one position to the other, it will be particularly noted, it joins the discs, and thereby the blades in contact with each other, during the change period, because one tooth of each end of the locker, is in a tooth space of both discs. This assures of unbroken connection with the pinions 18 and 18' of the constant driver A, and the engaging teeth 19, of the discs B.

The gear teeth 19 of the discs B, are located with respect to the width of the segmental blades, so that when the blades are in contact, as in Fig. 5 ready to move together, the gear teeth 19 of both discs, as seen from an end view, appear as a complete gear, and will function this way, during the change period, till that time in the operation, as in Fig. 5, when the blade b with its front face has been driven to the line 20, then that portion 19' without teeth, of the disc of blade b, will be free of the driver pinion 18' and be fully locked by the locker.

The rotary interlocking member C, is shown in detail in Figs. 8 and 9, and is preferably made as shown, to be readily assembled in the bearing member 9, and be of sturdy construction to withstand the rapid and constant engaging action with the tooth spaces of the driving discs B. The locker is made of two identical portions 24 and 25, except for a coupling portion 24' and 25' formed at the end of sleeve portions 26, on which the locker rotates. These sleeves extend inwardly from disc portions 27, the coupling being so arranged to key one end in a right angle position to the other, for so positioning the double end tooth portions 23 thereof extending outward of the discs 27 to perform the locking of the discs B, as heretofore stated. The two portions 24 and 25, are joined after assembling in the bearing 9, by a bolt 28 passing thru a free bore of one portion, into a threaded bore of the other.

The position in the cylinder where the blades a—b come to rest, is at the location shown by the radial line 20, and is where the inlet port 29 is placed, at the start of rotation of the blades, and the outlet 30 where the blades end their rotation, see Fig. 1.

In Fig. 10, which shows a modified form of my driving means, a constantly driven driving member, designated generally by A, and shown here as a pulley P' is mounted to rotate freely on the shaft 15 to which the blade b is fixed, to provide a direct drive, and is driven by a belt, or may be driven in any other well known manner.

The pulley carries a pinion 31 that is mounted on a short shaft 32 the axis of which is transverse to the shaft 15, and the pinion has an orbital movement, the teeth of which are the engaging means A' that engage with teeth of the driving discs B, between which the driving pulley P' is located.

The discs have driving teeth 33 and are always without interruption in mesh with the pinion 31, this engaging connection is similar to a differential drive. As here employed, when one or the other of the driving discs is held, the other will be driven, and the disc will make a full turn on a one half rotation of the driver pulley, as is well understood in this kind of gearing.

The driver discs, to which the gear teeth 33 are fixed have a flange 34 at the outer periphery thereof, each provided with a tooth space to engage the rotary interlocking member C, the action of which is identical with that described with relation to the former showing, and is similarly mounted in a bearing member 35, fixed to the framework, that also supports, by an upright part 36, the outer end of the shaft 15.

In this construction of my driving means, when the blades are moving together, by contact with each other the two driving discs are also moving. The pinion 31 at this time stops revolving, and the discs are then in such a position with the tooth spaces thereof with relation to the locking member to hold and control the blades and discs in a locked manner, from a fully locked position of one disc to the other, the locker during this time will be rotated by the discs, one tooth of the locker now in its fully locked position in one disc will move out of this tooth space, and another tooth of the locker into the tooth space of the other disc to be locked, holding the two discs, and thereby the blades joined, during such movement of the locker, from one position to the other, at the change period of this alternating drive.

In Figs. 11 and 12, also a modification, I show a longitudinal section and a front view, the latter in a diagrammatic manner, of my improved driving means, and similar to the showing of Fig. 10 in its operation.

The constant driver member, designated as A is mounted on the shaft 15, to rotate freely thereon, and is driven by the driver which is provided with teeth 40 to be driven by a gear 41, on a drive shaft 42 mounted in bearings of the framework, one end thereof, in a hub 43 of the cylinder, and the other end in a bearing bracket 44, which also supports the interlocking member C.

The driving discs, designated by B, are here provided each with two flanges, an inner flange as 45, and an outer flange 46, each having a tooth space. The outer flanges of the discs engage the rotary locker C, as in the other forms before described, which locker controls the blades during that portion of the movement when both blades move together, and locks one blade during the rotation of the other, and the locker itself is locked against rotation by one disc, during the locked position of the other.

The driver A instead of having gear teeth as the means A' in the former showing, to alternately engage the driving discs, designated by B, has a rotating clutch 47 which is in every respect the same in its construction, as the locker C, except here it is mounted in the driver A, on an axis parallel with the shaft 15 and is so positioned in a bore of the driver as to have an orbital movement and engage the inner flanges of the driver discs, which, as seen in Fig. 12, when the blades a and b have just made contact with each other, are moved by this clutch member, by a rotating action thereof on its axis, during the time the both blades a and b advance, so the front face of the blade b occupies the position at the radial line 20, in Fig. 12, during which time the clutch revolves, causing one tooth blade to enter into a tooth space in the disc to drive blade a, and rolling out of the flatwise position of the double ended tooth at the opposite end of the clutch, that was holding the clutch in a locked position, while same was driving the disc of blade a, to assume an upright position. In the disc for driving blade b, it will be noted that the rotary interlocking member C, is also rotating from a locked position of a tooth space in the outer flange 46 of the disc driving the blade a, and entering a tooth space of the disc driving blade b, this occurring approximately simultaneously with the rotation of the clutch, while the blades are thus moving together, and provide a joining action by contact between the two driving discs at this time. It will further be noted, this control is due to the fact that the locker C is rotated on a fixed axis of the framework, and the axis of the clutch is always in motion thru its orbital path.

In Fig. 13 is shown a detail of the clutch, in side and end views, in which, instead of oppositely disposed teeth 23 integrally connected, to provide the curved side portions, as in Figs. 8 and 9, of the locking member, the teeth may be formed as rollers 47, mounted on studs, two at each end of the clutch, one pair disposed at right angles to the other, two of which at one end, will lie in the contour of the flange of one disc, while one roller is in a tooth space of the other flanged disc.

Figs. 14, 15 and 16, show my driving means, more particularly that form thereof, described in connection with Fig. 10, which is in principle the same, here however the driving means is all contained within the hubs of the blades, and inside of the cylinder casing, providing an inclosed and compact construction.

The cylinder 2 is provided with removable end walls 50 and 51, each having hubs 52 and 53, the hubs extending both inward and outward thereof, the outer ends having stuffing boxes 54. A constantly driven driving shaft 55, which is the means, generally designated by A, is rotatably mounted in the bearings, passing entirely thru the bearings and driven at one end by a pulley 56.

In the center of the cylinder and between the inner hub extensions is a driver member 57, fixed to the shaft and carrying a pinion 58, as designated by A'; which pinion is mounted on a stud the axis of which is transverse to the shaft 55, and the pinion, which has an orbital movement, is in constant engagement with the teeth 59 of the driver discs, also designated by B, which are shown or fixed to the hubs 12 and 13 of the blades a and b, both of which hubs rotate freely on the inner hub extensions of the end walls, on a sleeve portion 60, fixed to the hubs. The sleeves at their inner ends have cam faces 61, which are adapted to engage with flat side portions of the pinion, as shown in Fig. 16, at 58'. The pinion 58, twice on each full orbital rotation thereof, engages these cam faces, this being necessary, as stated, with respect to Fig. 10, since in this kind of differential drive, when one disc is held in a locked position, the other will be driven a full revolution by the pinion 58, while the shaft 55 and the driver 57, makes a half rotation, due to the pinion rolling in the teeth of the disc being held locked, during the driving of the other disc, which it is believed, is readily understood.

While the locking member C is here omitted, it will be understood, it could be incorporated in this construction. The cam faces 61 and the flat sides of the pinion serve the same purpose, to hold the blades together while contacting each other during the period of the alternating action from one driver connection to the other; a locking means however is provided, to firmly hold the blade at rest, locked, during the full rest period.

The blades a and b are locked by a lock member 65, see Fig. 15, which is operated by the outer ends of the blades. The lock is shown engaged in blade a, held by a pin of the lock entering an aperture, provided in the top of each of the blades and the blade a is shown, now held locked, while the blade b is just starting its rotation, having been moved forward by blade a. When blade b completes its rotation, the top of the blade will engage a cam face 66 of the locker, and release blade a, and become locked.

The cam faces 61 of the sleeves are so positioned that the flat sides 58' of the pinion have just left the cam faces 61 when one or the other of the blades has just been locked allowing the pinion 58 to again rotate and drive the unlocked blade.

In Fig. 17 I show, instead of single blades carried by the hubs 12 and 13, an extra blade connected therewith, as herein-before referred to, and it will be understood that any number may be so employed, to form sets of blades, and these connected and driven with the driver disc, in the same manner, as in any of the forms of my driving means herein shown.

When using an extra blade, as here shown, one located directly opposite the other, the rotation thereof is reduced to a half rotation, instead of a full rotation, as required in the use of single blades, and when more than two are in the set, the amount of rotation is accordingly reduced, and the casing with respect to the inlet and outlet ports is arranged to suit this requirement.

In this showing only such parts are shown as to provide a clear understanding thereof, and the driver is of that form shown in Fig. 5.

The cylinder 2 has the inlet 70, connected by a passage 71, to feed two inlet ports 72 and 73, one located, directly opposite the other, so that one set of blades as *a, a*, that are joined to the hub 12, when in the position here shown, with the front faces of both blades *a, a*, that are at the radial line 20, and are about to start their motion, from the rest period, by being moved forward by blades *b, b*, and draw in from ports 72 and 73, at the rear faces thereof, and discharge by their front faces through ports, being the outlet ports 74 and 75, these ports also being connected by a passage 76 leading to the outlet 77.

The flanges of the driver discs that drive the blades have the tooth spaces in duplicate, to provide for a half rotation only, and the locker C will interlock in the same manner as before described, except that it operates each time the set of blades alternate during the change period.

When more blades are employed in one set, there will be more tooth spaces in the flanges of the drivers, and the driver teeth 19, that drive the discs, will be removed, at those places 19' and 19'' where the blades come to the rest position.

Fig. 18 shows the locking member C, located within the cylinder, and said member may be so located, instead of in the bracket, outside thereof, and this may be done in connection with any of the forms of my driving means, herein shown.

When the locker is thus placed in the cylinder, the blades will be provided with side discs, to take the place of the flanges, and the locker, instead of engaging the inner contour of the flange will engage the outer periphery of these discs, which are here a part of the blades, and the locker rotates on its axis outside thereof, to enter the tooth spaces of the discs, and the locker with the rollers, would be the better form thereof, instead of the type with integral teeth, and the rollers would extend inward from the discs on which they are supported, so the discs will be free of the blades, during the rotation thereof in the cylinder, otherwise the construction is the same as shown in Fig. 13.

When this construction is used, I prefer to provide the cylinder with removable end walls as in Fig. 14, here indicated at 50 and 51, the view of Fig. 18 showing only a portion of the cylinder, and a portion of the blades, the hubs of which, 12 and 13, have at their outer ends opposite each other discs 80 and 81, the full diameter of the cylinder, and engaging the end walls of the casing.

The discs will have the tooth spaces therein, to coact with the locker C, in the same manner, and serve the same purpose, except the tooth spaces will be in reverse order, since the locker being outside the periphery of the discs 80 and 81, will rotate the locker in a reverse direction, to that of the position the locker has inside the flange contour, rotating internally thereof. The locker is located in a bore 82 of the cylinder close to the bore 8' thereof, and the discs 27 of the locker, revolve freely in pockets 83, in the end walls.

As a final summary of the main features, herein set forth, with reference to all the forms thereof, it will be particularly noted, my driving mechanism rotates the blades in a steady uniform motion, each blade being driven the major part of its rotation, from a starting position, a position to which it is propelled from a locked position thereof, by the blade that follows it, while the following blade is actuated to its locked position, this occurring in successive order, one blade after the other, with the single pair of blades, or the sets of blades.

The constant driven driver, identified by A, is the shaft 16 in one form, as in Fig. 4, in the other forms, as in Fig. 10, the pulley P', and in Figs. 11, 12 and 14, a similar drive revolving freely on a shaft, or with the shaft.

Each have a means, as A', connected therewith, to make an alternate engagement with the driver discs identified by B that drive the blades, either in constant engagement with the engaging means B' thereof, or by stepping into such engagement.

During the time the blades are thus being moved from the locked position thereof, to the actual full engagement with the driver connections, the locker, identified by C is being rolled on its axis drawing one tooth thereof out of one driver disc, while another tooth is entering in the other driver disc, holding the blades in the contact engagement they have at this change period.

While the blades are in rotation the locker is held in its locked position, by causing engagement of two teeth on the sides thereof within the contour of one or the other of the discs.

This is true also of the clutch constructed like the locker, as in Fig. 11, that is here used as the engaging means A'.

The mechanism is adapted to drive the blades, as stated, for pumping, and may be driven by the blades, as by an engine.

The mechanism also may be driven to the right, or left, in which case the inlet and outlet ports of the cylinder, may be arranged to suit this requirement.

Having thus described my invention, what I claim as new and desire to secure by Letters Patent is as follows:

1. In a pump, in combination, a casing having an inlet and an outlet, segmental shaped radial blades closely fitting within the casing and arranged for relative alternate rotary pumping action, opposed blade operating disks presenting apertured flanges, means for operatively connecting the disks to the blades, means for actuating said disks, arresting means for preventing movement of one of the disks while the other is operating, including a rotatable interlock piece between said disks having co-axial extensions at the opposite ends thereof disposed at right angles to each other and arranged to alternately engage the apertures in the flanges of said disks.

2. In a pump, in combination, a casing having inlet and outlet ports, a bearing exteriorly of said casing, a blade shaft journalled in the casing and in said bearing, a plurality of radial blades each having a hub portion co-axial with said shaft, the blades closely fitting within the casing and being arranged for pumping coaction, the hub of one of the blades being fixed to said shaft and the hub of the other blade being free on the shaft and extending exteriorly of said casing, spaced drive disks co-axial with said shaft, one of the disks being secured to the shaft and the other secured to said exterior hub part, said disks presenting peripheral gear teeth, an untoothed section and opposed apertured flanges, driving gears for operating said disks alternately, and arresting means for engagement in the apertures of said disks to prevent rotation of one of the said disks while the other is operating.

3. In a pump, in combination, a casing having an inlet and an outlet, a bearing exteriorly of the casing, a blade shaft journalled in the casing and in said bearing, a plurality of radial blades each having a hub portion, co-axial with said shaft, the blades closely fitting within the casing and being arranged for pumping coaction, the hub of one of the blades being fixed to said shaft and the hub of the other blade being free on the shaft and extending exteriorly of the casing, spaced drive disks co-axial with said shaft, one of the disks being secured to the shaft and the other to said exterior hub part, said disks presenting peripheral gear teeth, an untoothed section and opposed apertured flanges, driving gears for operating said disks alternately, arresting means for preventing movement of one of the disks while the other is operating including a rotatable interlock piece positioned between said disks having co-axial extensions at the opposite ends thereof disposed at right angles to each other and arranged to alternately engage the apertures in the flanges of said disks.

4. In a pump, in combination, a casing having an inlet and an outlet, segmental shaped radial blades closely fitting within the casing and arranged for relative alternate rotary pumping action, opposed blade operating disks presenting apertured flanges, means for operatively connecting the disks to the blades, means for actuating said disks, including gear teeth on both said disks, a bevel gear in mesh with the teeth of both disks, a pulley in which said bevel gear is mounted for planetary movement relatively to said disks, arresting means for preventing movement of one of the disks while the other is operating, including a rotatable interlock piece between said disks having co-axial extensions at the opposite sides thereof disposed at right angles to each other and arranged to alternately engage the apertures in the flanges of said disks.

5. In a pump, in combination, a casing having an inlet and an outlet, segmental shaped radial blades closely fitting within the casing and arranged for relative alternate rotary pumping action, opposed blade operating disks presenting apertured flanges, means for operatively connecting the disks to the blades, means for actuating said disks, arresting means for preventing movement of one of the disks while the other is operating, including a rotatable interlock piece between said disks having co-axial extensions at the opposite ends thereof disposed at right angles to each other and arranged to alternately engage the apertures in the flanges of said disks, and each blade being arranged to contact and move the other blade near the end of each rotation for actuating the interlock member.

6. In a pump, in combination, a casing having an inlet and an outlet, segmental shaped radial blades closely fitting within the casing and arranged for relative alternate rotary pumping action, opposed blade operating disks presenting apertured flanges, means for operatively connecting the disks to the blades, means for actuating said disks, including a gear between the disks, a primary interlocking member rotatably mounted in the gear and having co-axial extensions at the opposite ends thereof at right angles to each other arranged to alternately engage the apertures of the disk flanges to provide a driving connection between the gear and one of the disks, and a secondary interlocking member rotatably mounted between the disks and including co-axial extensions at the opposite sides thereof at right angles to each other arranged to alternately engage apertures of the disk flanges to hold one of the disks stationary while the other is rotating, and each blade being arranged to contact and move the other blade near the end of each rotation for actuating the secondary interlocking member.

FREDERICK ROSNER.